(12) United States Patent
Metz et al.

(10) Patent No.: US 11,773,846 B2
(45) Date of Patent: Oct. 3, 2023

(54) SCREW SPINDLE PUMP

(71) Applicant: LEISTRITZ PUMPEN GMBH, Nuremberg (DE)

(72) Inventors: Jürgen Metz, Feucht (DE); Kristin Lissek, Fürth (DE); Florian Popp, Nuremberg (DE)

(73) Assignee: LEISTRITZ PUMPEN GMBH, Nuremberg (DE)

( * ) Notice: Subject to any disclaimer, the term of this patent is extended or adjusted under 35 U.S.C. 154(b) by 0 days.

(21) Appl. No.: 18/076,863

(22) Filed: Dec. 7, 2022

(65) Prior Publication Data
US 2023/0184244 A1 Jun. 15, 2023

(30) Foreign Application Priority Data
Dec. 14, 2021 (DE) ...................... 10 2021 133 109.9

(51) Int. Cl.
*F04C 2/16* (2006.01)
*F04C 15/06* (2006.01)
*B60H 1/00* (2006.01)

(52) U.S. Cl.
CPC ............... *F04C 2/16* (2013.01); *F04C 15/06* (2013.01); *B60H 1/00278* (2013.01); *F04C 2240/30* (2013.01); *F04C 2240/50* (2013.01)

(58) Field of Classification Search
CPC ........ F04C 2/16; F04C 15/06; F04C 15/0096; F04C 15/0073; F04C 15/0038;
(Continued)

(56) References Cited

U.S. PATENT DOCUMENTS 4,462,769 A * 7/1984 Schibbye ............ F04C 29/0021
418/94
9,765,776 B2 9/2017 Metz
(Continued)

FOREIGN PATENT DOCUMENTS

DE 2621303 A1 11/1976
DE 4123384 A1 1/1993
(Continued)

OTHER PUBLICATIONS

German Office Action dated Sep. 20, 2022, 8 Pages.
(Continued)

*Primary Examiner* — Audrey B. Walter
*Assistant Examiner* — Dapinder Singh
(74) *Attorney, Agent, or Firm* — LUCAS & MERCANTI, LLP; Klaus P. Stoffel

(57) ABSTRACT

A screw spindle pump having a spindle housing, in which a drive spindle and at least one running spindle which meshes therewith are received in spindle bores, and which has an axial fluid inlet and an axial fluid outlet, and also an outer housing enclosing the spindle housing, wherein either a support device which axially supports the at least one running spindle and includes an axially projecting support pin is provided on the spindle housing, which is plastic, in the region of the fluid outlet, or a support device which axially supports the at least one running spindle and includes an axially projecting support pin is provided on a housing plate which is fitted on the outer housing, axially closes the outer housing, and is plastic.

18 Claims, 5 Drawing Sheets

(58) Field of Classification Search
CPC ...... F04C 29/00; F04C 29/04; F04C 29/0071; F04C 29/0078; F04C 29/0038; F04C 18/16; F04C 2240/20; F04C 2240/30; F04C 2240/40; F04C 2240/50; F04C 2240/60; F04C 2240/805; F04C 2210/26; F04C 2230/604; F04C 21/10
See application file for complete search history.

(56) References Cited

U.S. PATENT DOCUMENTS

| | | |
|---|---|---|
| 11,306,715 B2 | 4/2022 | Deichmann |
| 2016/0222964 A1* | 8/2016 | Metz ................... F04C 15/0061 |
| 2019/0017504 A1* | 1/2019 | Inoue ........................ F04C 2/16 |
| 2021/0164468 A1 | 6/2021 | Deichmann |
| 2022/0018345 A1 | 1/2022 | Nickel |
| 2022/0049697 A1 | 2/2022 | Pawellek |

FOREIGN PATENT DOCUMENTS

| | | |
|---|---|---|
| DE | 102014102390 B3 | 3/2015 |
| DE | 102017210767 A1 | 12/2018 |
| DE | 102018130472 A1 | 6/2020 |
| DE | 102018131587 A1 | 6/2020 |
| GB | 263540 A | 12/1926 |

OTHER PUBLICATIONS

European Patent Office issued a Search Report dated May 23, 2023 regarding parallel European Patent Application No. 22209990.5: 4 Pages.

* cited by examiner

SCREW SPINDLE PUMP

CROSS-REFERENCE TO RELATED APPLICATIONS

The present application claims priority of DE 10 2021 133 109.9, filed Dec. 14, 2021, the priority of this application is hereby claimed, and this application is incorporated herein by reference.

BACKGROUND OF THE INVENTION

The invention relates to a screw spindle pump having a spindle housing, in which a drive spindle and at least one running spindle which meshes therewith are received in spindle bores, and which has an axial fluid inlet and an axial fluid outlet, and also an outer housing enclosing in the spindle housing.

Such a screw spindle pump serves to deliver a fluid and is used in a very wide variety of fields. An example that can be cited is the delivery of a fuel or another operating or supply fluid, for example a coolant or cleaning agent, for a motor vehicle. Such screw spindle pumps can also be used in other land vehicles or aircraft, such as e.g. airplanes or drones, the possible uses not being restricted thereto. Such a screw spindle pump has a spindle housing, which can also be referred to as inner housing, in which at least two spindles, specifically a drive spindle and a running spindle, are received in respective spindle bores which do, however, intersect one another. The drive spindle and the running spindle each have a spindle profile, the two spindle profiles meshing with one another. The drive spindle is connected to a drive motor and can be actively rotated, this also leading to a rotation of the meshing running spindle. As a result of the spindle rotation, a delivery volume is continuously displaced in the direction of the spindle longitudinal axis, in which delivery volume the fluid is delivered. The spindle housing is received in an outer housing which for example may be pot-like and may be terminated on one side by an axial wall, while the drive motor, for example, is flange-mounted on the other side. However, it is also conceivable for the outer housing to have multiple parts and comprise a cylindrical base part terminated on the one side by a cover, while the drive motor in turn is flange-mounted on the other side. The outer housing has an inlet port to which a feed line can be connected, whereby the suction side is defined. It also has an outlet port, to which a line can likewise be connected and by way of which the pressure side is defined. There, the delivered fluid exits at the particular pressure that can be generated by the pump. A pump of this type is described, for example, in DE 10 2018 131 587 A1. The spindle housing itself has an axial fluid inlet on the suction side, via which fluid inlet the fluid to be delivered flows from the connection piece into the spindle housing, through which it is then delivered by the interacting spindles and which said fluid leaves via an axial fluid outlet, from where it then flows to the outlet port, where it is discharged.

In order to deliver the fluid, the drive spindle must be rotated in a defined direction, with the result that the delivery volume is displaced from the suction side to the pressure side. On account of the given pressure conditions, it is known to axially support the two spindles or, in the case of a 3-spindle pump, the drive spindle and the two running spindles on the suction side via a support element, such as for example a feather key, against which support element the spindles can run by way of their end faces. Reversing the direction of rotation, as might sometimes temporarily be expedient, is difficult. Indeed, the drive spindle is axially supported toward the pressure side, since the drive shaft of the motor, which has a support function, as it were, engages on it. However, the running spindle is axially not supported, which is why inadvertent spindle displacement can occur when there is such a reversal of the direction of rotation.

SUMMARY OF THE INVENTION

The invention is based on the problem of specifying a screw spindle pump which is improved by contrast.

To solve this problem, in the case of a screw spindle pump of the type mentioned in the introduction, it is provided according to the invention that either a support device which axially supports the at least one running spindle and comprises an axially projecting support pin is provided on the spindle housing, which consists of plastic, in the region of the fluid outlet, or that a support device which axially supports the at least one running spindle and comprises an axially projecting support pin is provided on a housing plate which is fitted on the outer housing, axially closes the outer housing, and consists of plastic.

According to the invention, on the one hand a defined axial support of the running spindle is also provided on the pressure side by a support device provided there, which is realized in the form of an axially projecting, axial support pin, which is shorter or longer depending on the given installation space situation. According to the invention, this support device may be provided in two basic, different configurations.

According to a first alternative of the invention, the support device may be provided and/or integrally molded as a one-piece part on the spindle housing manufactured from plastic. This means that the spindle housing, which is in one piece or integral, not only receives the spindles in the spindle bores, but at the same time also comprises the axial support bearings for the one or, in the case of two running spindles, for the two running spindles. Since the spindle housing is manufactured from plastic, the formation or integral molding of a corresponding support device is readily possible by means of a suitable plastics injection mold. The drive motor is fitted directly on the outer housing and axially closes the latter by way of a corresponding motor plate.

According to a second alternative, the support device is provided on a housing plate, which is fitted on the outer housing, closes the outer housing on this side and likewise consists of plastic, it also being possible to refer to said housing plate as intermediate plate or mounting plate. The drive motor is fitted and flange-mounted on this housing plate. Since in the second alternative the outer housing is closed by the housing plate, it is accordingly the case that the one-piece integral molding of the support device on the housing plate is expedient in this variant. This means that the axially projecting support pin is integrally molded in one piece on or from the same material as the housing plate, this also being possible without problems here since the housing plate is a plastics component, and therefore the corresponding shaping is readily possible in a suitable plastics injection mold.

In the case of the screw spindle pump according to the invention, therefore, all the spindles are axially supported on both sides. This allows spindle rotation in both directions, that is to say right-hand/left-hand running. This means that on the one hand of course routine delivery operation is possible; on the other hand, however, when required, it is also possible to temporarily reverse the spindle rotation direction, without giving rise to an unacceptable spindle offset.

As described, in the case of a 2-spindle pump, only one drive spindle and one running spindle are provided, and therefore ultimately it is also only necessary to provide one support pin assigned to the running spindle. As an alternative, the screw spindle pump may also be configured as a 3-spindle pump, wherein in that case two running spindles arranged on either side of the drive spindle are provided, and the support device comprises two support pins, or two support devices having a respective support pin are provided.

As described, the spindle housing has the corresponding spindle bores. In the case of a 2-spindle pump, a drive spindle bore and a bearing spindle bore are provided; in the case of a 3-spindle pump, a central drive spindle bore and two lateral running spindle bores are provided. As described, the or each support pin should axially support the running spindle centrally, that is to say in the spindle longitudinal axis. In order to make this possible, an expedient refinement provides that a support device integrally molded on the spindle housing has at least one or at least two webs, wherein the or each web reaches over a spindle bore receiving the running spindle, and wherein a support pin is provided on the or each web. By way of this web arrangement, easy formation and positioning of the or each support pin in the center of the running spindle bore is possible. This is because the web extends from a lateral housing position virtually transversely across the running spindle bore, the support pin in that case being integrally molded in the center of the bore.

The or each support pin expediently has a round cross section, this being expedient in particular from a manufacturing perspective. The pin diameter itself is of course substantially smaller than the core diameter of the spindle core of the running spindle, and therefore a contact or friction surface which is as small as possible is provided. As an alternative, the cross section may also be oval or polygonal. The pin tip preferably is of convex design, with the result that a point contact, as it were, with the spindle end face is provided. Instead of the convexity, the spindle end face may also be slightly convex, while the pin surface is flat.

As described, the support device is provided on the pressure side, that is to say the side where the drive motor is provided. In the case of a support device integrally molded on the spindle housing, one expedient refinement provides that the support device has a bearing bore, through which the drive shaft of a drive motor passes and which bears the drive shaft. This means that the support device is additionally also provided with a bearing function for the drive shaft, with the result that it is not necessary to provide any additional bearing means at another location outside the drive motor itself to that end. The drive shaft of the drive motor fitted directly on the spindle housing extends from the motor and/or the motor plate to a coupling device, via which the drive spindle is coupled to the drive shaft. Along this segment, the drive shaft is guided in the bearing bore of the support device at an axial position, so that on the one hand an exact alignment of the drive shaft in relation to the drive spindle is provided, and on the other hand also permanent shaft guidance, which avoids the formation of possible unbalances and the like.

To realize the bearing bore, the support device may have a central annular portion, in which the bearing bore is provided and from which annular portion the webs extend to the side. Accordingly, a virtually open, basket-like or mesh-like structure is formed at the end of the spindle housing. On the one hand, this ensures a corresponding passage of fluid; on the other hand, via the webs, it is also the case that a correspondingly stable configuration can be realized as well as it being possible to form the corresponding support pins on the webs, as well as lastly also the corresponding bearing for the shaft being possible without problems.

As an alternative to the arrangement of the support device on the spindle housing, the support device(s) may also be provided on the housing plate, as described. In this case, the housing plate may have a pot-like depression, into which the fluid flowing out of the fluid outlet of the spindle housing flows, wherein the one or the two support devices are provided on the bottom of the depression and extend axially. The depression in the housing plate is expedient on the one hand for providing a sufficiently large outlet space in the region of the fluid outlet of the spindle housing, into which outlet space the pressurized fluid flows first of all, before it then flows to the actual outlet port, which protrudes mostly radially from the outer housing. By way of this depression, which for example has a round cross section in the region of the outer circumference and has no corners or edges, one the one hand fluidically expedient guidance of the fluid radially outward is possible, from where the fluid then flows to the outlet port. Furthermore, in this way it is also possible to realize very quiet pump operation. The support device(s) or the support pin(s) is then integrally molded on the bottom of the depression, this being possible without problems, in this variant the corresponding positioning of the support pins in relation to the position of the running spindle longitudinal axis being readily possible, any web-like mounts etc. not being necessary here.

The or each support device may have a base which is integrally molded on the bottom and from which the support pin, which is narrower than the base, protrudes. As described, on account of the depression geometry of the bottom, viewed axially the housing plate is spaced apart to some extent from the end face of the respective running spindle. This means that the support device must bridge a certain axial segment from the bottom to the running spindle. The support pin itself preferably has a relatively small diameter. In order to attach the support pin to the depression base stably enough, on the bottom first of all there is provided a corresponding base which has a considerably wider diameter and which extends axially, and then the considerably narrower or thinner support pin is integrally molded thereon. This avoids a situation in which the geometry of the support pin changes in any way, this possibly being the case if, in the form of a very thin pin, it is integrally molded directly on the bottom of the depression and extends as far as the running spindle.

As described, the housing plate is fitted directly on the outer housing and axially closes it. The drive motor is fitted on the housing plate. In order to be able to guide the drive shaft of the drive motor in relation to the drive spindle, the housing plate is provided with a corresponding bearing bore which is provided in the bottom and through which the drive shaft of the motor runs.

As described, on the suction side the spindles are likewise axially supported by a suitable support element, such as for example a feather key. This support element may be arranged in a different way. According to a first alternative, the spindle housing is axially open on the opposite side to the support device, wherein, according to a first variant, holding means for fixing a support element, that is to say for example the feather key, that axially supports the drive spindle and the one or the two running spindles are provided in the region of the open end. Here, therefore, the support element, or the feather key, is arranged on and fixed to the spindle housing itself. As an alternative, in the case of an axially open spindle housing, it is conceivable for the support element to be received between the end face of the spindle housing and an axial housing wall of the outer housing. Here, consequently, the support element, or the feather key, is received between the spindle housing and the axial outer housing wall. The fixing is thus effected, as it were, by correspondingly clamping the support element between the spindle housing and the outer housing. Here, in the case of both variants, the outer housing may have a pot-like configuration, with a cylindrical housing portion and an adjacent axial housing wall, on which for example the axial inlet port is provided. As an alternative, the outer housing may also be in two parts, with an e.g. cylindrical housing part on which a cover-like axial housing wall is fitted, on which the inlet port is provided.

Lastly, however, it is also conceivable for the support element, or the feather key, to be provided on a separate, cover-like housing wall of the outer housing which in this case is in two parts, for example in a corresponding clamping groove or the like, which is formed on the inner surface of this separate housing wall.

If the support element, or the feather key, is fastened to the spindle housing itself, the holding means on the housing are expediently configured in the form of two oppositely situated apertures in the spindle housing, in which apertures the support element in the form of the feather key engages. The feather spring is accordingly pushed from the outside through the one aperture and into the other, it being the case here for example that a gentle clamping fit leads to it being self-holding.

As described, the spindle housing is preferably made of plastic, this making it possible, within the context of the first basic variant of the invention, to easily and directly integrally mold the support device on the spindle housing, but also, in the case of the second variant, being expedient in terms of easy production of the spindle housing and a pump weight which is as low as possible. In the case of known screw spindle pumps, a radial outlet port is usually provided, that is to say that the delivered fluid either directly radially leaves the spindle housing itself and flows into a small chamber, which opens toward the outlet port. In the case of an axial exit from the spindle housing, a corresponding flow guide toward the radial outlet port is likewise necessary. A pressure gradient is provided within the spindle housing, specifically from the suction side at a lower fluid pressure to the pressure side at a high fluid pressure. In the case of a spindle housing manufactured from plastic, in the event of large pressure gradients, this can lead to the geometry of the spindle housing, which consists of plastic, sometimes changing and can cause said spindle housing to widen slightly, in particular in the direction of the fluid outlet, this having an adverse effect on the efficiency or degree of effectiveness of the pump. In order to confront this, an expedient refinement of the invention provides that the axial fluid outlet for the fluid delivered through the spindle housing by the drive spindle and the running spindle communicates with a fluid chamber, which is formed between the spindle housing and the outer housing, extends around 360°, and in turn communicates with the radial fluid outlet port of the outer housing. Accordingly, a radial fluid chamber, which surrounds the spindle housing in the form of an annular chamber around the circumference, is provided between the spindle housing and the outer housing. This annular fluid chamber, which can also be referred to as pressure chamber, lies on the pressure side, since the pressurized fluid exiting the spindle housing is supplied to it. This fluid exits the spindle housing axially, that is to say that a correspondingly large, axial fluid outlet opening is provided on the spindle housing, in the region of which opening, as described for a one-piece design, the support device is provided. The pressurized fluid flows out of the outlet opening, correspondingly deflected and guided radially outward, into the fluid chamber, in which the pressurized fluid is therefore present. Advantageously, as a result of the annular geometry of this fluid chamber, the corresponding pump pressure is present on all sides around the spindle housing, that is to say that ultimately almost symmetrical pressure conditions are provided at the spindle housing or a symmetrical pressure applies load to the covering region. On the one hand, this avoids local excessive increases in pressure, as result from an unsymmetrical pressure distribution. On the other hand, deformations of the spindle housing that, although they are small, are produced as a result of the fluid pressure building up in the spindle housing, are avoided, since the spindle housing is subjected to load from the fluid pressure radially outwardly and is therefore stabilized. Accordingly, a fluid jacket which forms a corresponding radial pressure is realized. This makes it possible on the one hand to manufacture the spindle housing readily from the soft plastics material, and on the other hand, however, also to be able to create correspondingly high pump pressures.

The fluid chamber provided according to the invention preferably extends over at least part of the axial length of the spindle housing or of the housing region in which the spindle bores are provided. In this respect, the fluid chamber should extend over at least half the length of the spindle bore or of the spindle housing, if appropriate even longer than that, for example over approximately ⅔ of the length of the spindle bores or of the spindle housing. It is also conceivable for the fluid chamber to extend over the entire length of the spindle bore or of the spindle housing. On account of the axial exit of the fluid from the spindle housing, this leading, among other things, to the reduction of some flow noises and therefore being advantageous, and on account of the necessary deflection in the direction of the fluid chamber, the fluid chamber ultimately begins at the pressure-side end of the spindle housing and then, as viewed axially, extends to the suction-side end. The fluid chamber is of course correspondingly sealed in a suitable way, with the result that an undesired fluid flow back to the suction side is ruled out and the fluid can flow out exclusively via the radial outlet port.

Since, as described, the fluid exits the spindle housing axially, but the fluid chamber extends as it were from the pressure side in the direction of the suction side, it is necessary to deflect the pressurized fluid and virtually guide it back again axially. In order to enable this, the depression of the housing plate may serve as deflection cavity which deflects the fluid exiting from the fluid outlet of the spindle housing toward the fluid chamber. This depression, which extends radially relatively far to the side, accordingly makes it possible to guide the fluid back again, as viewed axially, with the depression of course communicating with the annular fluid chamber. As an alternative to this configuration, if no housing plate is provided, it is also possible for a deflection cavity which deflects the fluid coming from the fluid outlet of the spindle housing toward the fluid chamber to be provided on a housing of a drive motor fitted on the outer housing. Here, the motor housing wall, which axially closes the outer housing on the motor side, by way of its depression thus serves as deflection means, which conducts the fluid back into the fluid chamber, as viewed axially.

In this respect, the deflection cavity, regardless of whether it is then provided on the housing plate, that is to say the intermediate component, or on the motor wall, may be configured as an annular groove or pot-shaped depression, in which, as already described, the support devices are provided and which has a round configuration in the region of the groove or depression base. By way of this round configuration, a quiet radial and axial deflection is enabled.

In addition to the screw spindle pump itself, the invention also relates to the use of a screw spindle pump of the type described above in a motor vehicle for the purpose of delivering an operating liquid. This operating liquid may be of any desired nature. For example, it may be a cleaning liquid, for example a windscreen cleaning liquid, which is delivered by the pump. An alternative, and a preferred intended use according to the invention, is the use of the screw spindle pump as a coolant pump, which delivers a coolant. Such a coolant may be any desired fluid, in order to cool an object to be cooled. The use relates in particular to employment for delivering a coolant serving to cool an energy store. Such an energy store is increasingly being used in electromotively driven motor vehicles and is provided in the form of a correspondingly dimensioned traction or drive battery. The energy store necessitates corresponding cooling by means of a coolant, which can be delivered by the screw spindle pump according to the invention easily, in the amount required, and without problems.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
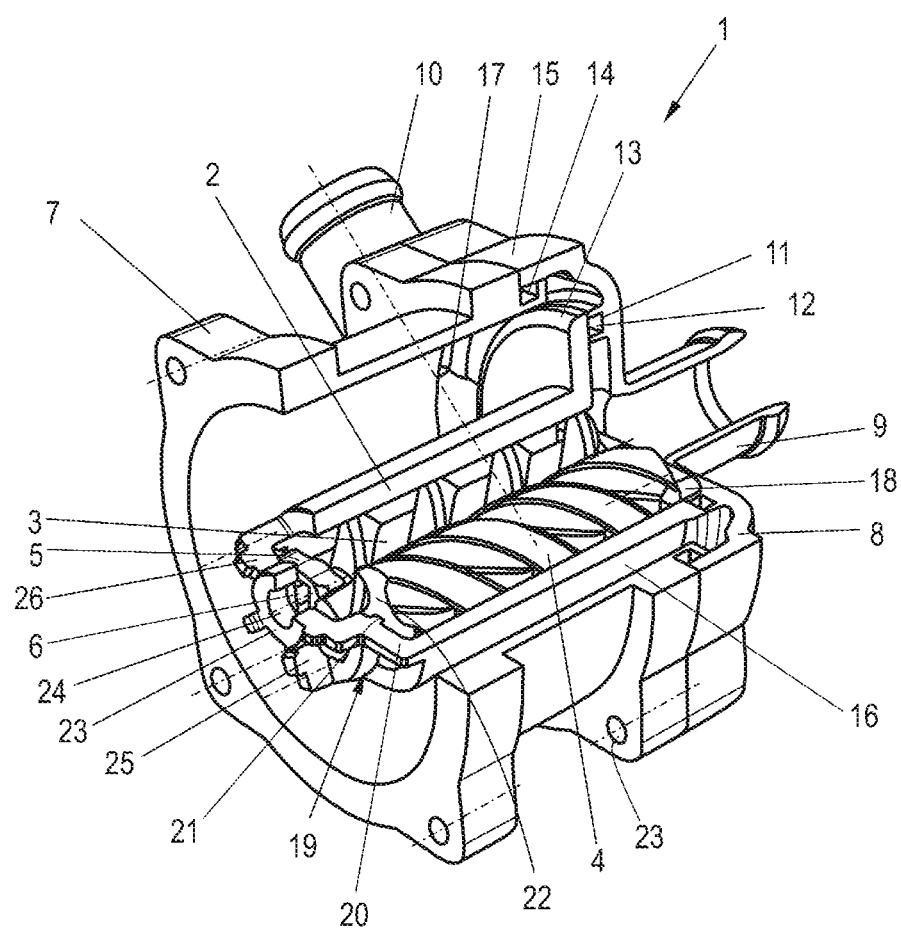
FIG. 1 shows a basic illustration of a first embodiment of a screw spindle pump according to the invention in a sectional view.

FIG. 1 shows a screw spindle pump 1 according to the invention, with a spindle housing 2, in which, in the exemplary embodiment shown, two spindles are received, specifically a drive spindle 3 with a spindle profile and a running spindle 4 with a spindle profile. The two spindle profiles, or spindles 3, 4, mesh with one another in a known manner. The drive of this spindle set is effected by the drive spindle 3, which is coupled to a drive motor, not shown here in more detail, or its drive shaft. A coupling element 5 with an insertion receptacle 6 for a coupling pin of the drive shaft, the coupling element 5 being coupled to the drive spindle 3 for conjoint rotation therewith, serves that purpose. The drive motor is fitted on an outer housing 7 and screwed thereto, the virtually hollow-cylindrical outer housing 7 completely receiving the spindle housing 2, as shown in FIG. 1. The outer housing 7 is closed, as viewed axially on this side, by the drive motor, not shown in more detail, or the motor housing. On the opposite side, a cover component 8 is fitted axially on the outer housing 7, which closes the outer housing 7 and thus the pump interior on this side. The cover component 8, preferably a plastics component, has an axial fluid inlet port 9, that is to say that the fluid to be delivered is axially drawn in, or introduced, on this suction side. It also has a fluid outlet port 10, which laterally protrudes to the side, that is to say here rotated by 90° in relation to the fluid inlet port 9, and via which the pressurized fluid is discharged to the side. As well as of course the connection between the outer housing 7 and the drive motor, or the motor housing, being correspondingly sealed by one or more seal elements, the connection of the cover component 8 to the outer housing 7 is also sealed in relation to the spindle housing 2. To that end, on the cover component 8 there is provided an annular flange 11 with an axial receiving groove 12, in which a first seal element, not shown in more detail, is to be arranged. This seal element provides axial sealing toward an annular flange 13 of the spindle housing 2. The sealing in relation to the outer housing 7 is effected likewise by a sealing means, not shown in more detail, which is received in a radially open receiving groove 14 formed in the outer housing 7, a flange 15 of the cover component 8 radially reaching over this receiving groove 14. In this way, complete sealing on the one hand of the outer housing but on the other hand also of the spindle chamber is achieved, with the result that the pressurized volume can no longer flow back into the suction region. The drive motor fitted on the outer housing 7 has a motor plate which axially closes this side and therefore the spindle chamber on this side, provided said drive motor is fitted directly on the outer housing. As an alternative, it is also possible for a housing plate to be interposed, as will be discussed below. In any case, corresponding seal elements, not shown in more detail, are also provided on this side.

Between the spindle housing 2 and the outer housing 7 there is formed a fluid chamber 16, which reaches 360° around the spindle housing 2 and into which the fluid flowing out of the spindle housing 2 axially, that is to say in the direction of the drive motor, is deflected and admitted. This means that the fluid outlet on the spindle housing side communicates with the fluid chamber. The fluid chamber 16 for its part also communicates with the fluid outlet port 10, to which end a corresponding opening 17 is provided on the cover component 8. This opening 17 is open toward the fluid chamber 16. The fluid chamber 16 is filled with the already pressurized fluid, with the result that the fluid can exert a corresponding pressure on the spindle housing 2 around the circumference, which pressure counteracts any changes in geometry of the spindle housing 2. The deflection is effected by a corresponding deflection cavity, which is formed either on the housing wall, which closes the pump chamber, of the motor housing when the latter is fitted directly on the outer housing 7, or on the interposed housing plate, which is arranged between the outer housing 7 and the motor housing. This housing plate will be described in more detail below in relation to FIGS. 4-6.

The two spindles 3, 4 are axially supported axially on the suction side, that is to say on the cover component 8, where the fluid inlet into the spindle housing 2 is provided, by a support component 18 in the form of a feather key, and therefore here a defined counterbearing is formed. In the opposite direction, the drive spindle 3 is axially supported on the drive shaft of the motor. To axially support the running spindle 4, a support device 19, comprising a web 20 on which an axially projecting support pin 21 projects axially in relation to the running spindle 4, is integrally molded in one piece on the plastics spindle housing 2. The running spindle 4 by way of its axial end face 22 can run, or is supported, against this axial support pin 21. The support device 19, as described, is integrally molded in one piece on the plastics spindle housing 2. This is therefore a component of the same material, which not only forms the actual spindle housing, but furthermore also comprises the support device 19. Since only one running spindle 4 is provided, it is also the case that only one such support device 19, or only one such support pin 21, is provided.

Furthermore, likewise integrally molded in one piece on the spindle housing 2 is a central annular portion 23, which has a bearing bore 24 through which the motor-side drive shaft, not shown in more detail, runs and in which it radially bears. On the one hand, the web 20 extends from this central annular portion 24 toward the housing wall, and, on the other hand, a few further webs 25 are provided via which the central annular portion 24 is attached to the housing. The bearing bore 24 receiving the drive shaft is exactly in line with the central axis of the spindle bore receiving the drive spindle 3, with the result that there are no tolerances between the drive shaft bearing and the spindle axis and thus within the coupling of the two components. Consequently, there are no unbalances, and very quiet and noiseless running of the spindles is achieved as a result.

Figure 2:
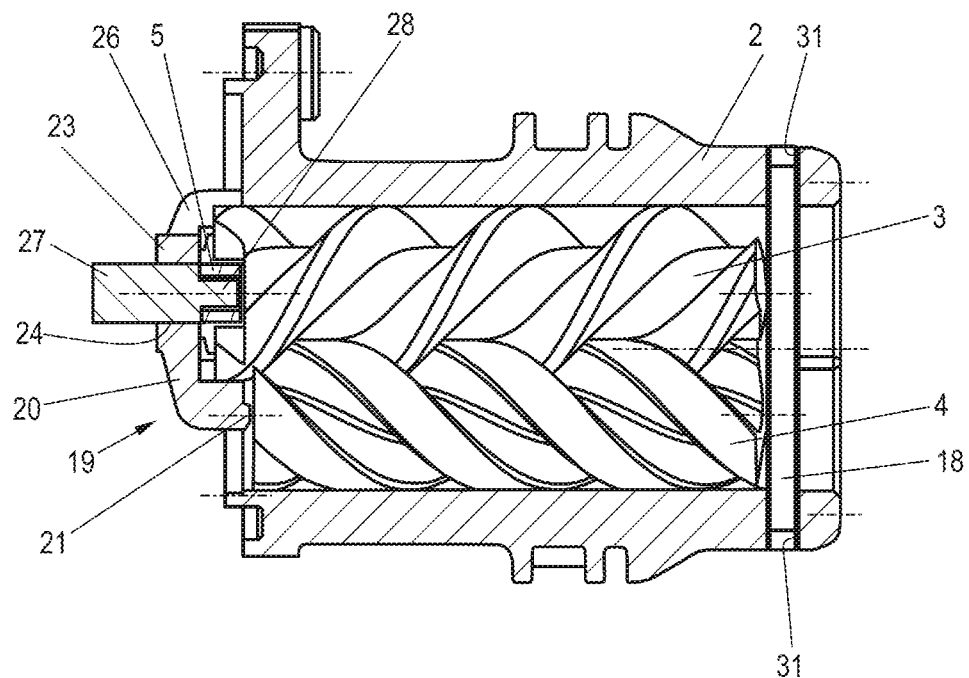
FIG. 2 shows a sectional view through the spindle housing with drive and running spindles received therein, and a support device integrally molded thereon.

FIG. 2 shows a sectional view of the spindle housing 2 in addition to the drive spindle 3 and the running spindle 4, which clearly mesh with one another. Also shown is the support device 19 that is integrally molded in one piece on the spindle housing 2, as indicated by the even hatching. The web 20 and the axially projecting support pin 21, which projects axially in relation to the running spindle 4, are shown. Furthermore shown is at least one further web 26 via which the annular portion 23, in which the bearing bore 24 is formed, is attached to the spindle housing 2. Furthermore illustrated in principle is a drive shaft 27, which runs from the drive motor, not shown here in more detail, through the bearing bore 24 and engages in the coupling element 5 by way of an insertion pin 28.

Figure 3:
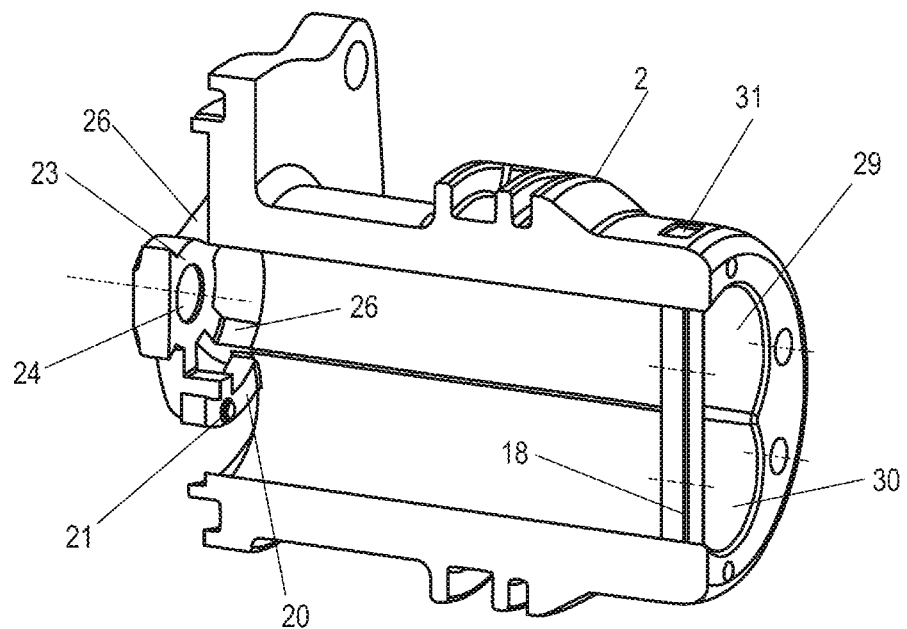
FIG. 3 shows a perspective view, in section, of the spindle housing of FIG. 2.

The spindle housing 2 is again shown in the perspective sectional view according to FIG. 3, in this case without the two spindles. The two spindle bores, with the one spindle bore 29 receiving the drive spindle 3 and the other spindle bore 30 receiving the running spindle 4, can be readily seen. The support pin 21 can be readily seen here on the web 20 that is shown. Further webs 26 and the central annular portion 23 with the bearing bore 24 are also shown.

Furthermore shown is the feather key 18; also see FIG. 2 in this respect. To fasten the feather key 18 to the spindle housing 2, the spindle housing 2 has two apertures 31, in which the feather key 18 is pushed and in which they are preferably gently fixed by clamping. In the mounting position, see FIG. 2, the two spindles 3, 4 are axially supported on one side, on the suction side, against the feather key 18. On the other side, that is to say the pressure side, the drive spindle 3 is axially supported on the drive shaft 27, while the running spindle 4 is supported on the support pin 21.

Figure 4:
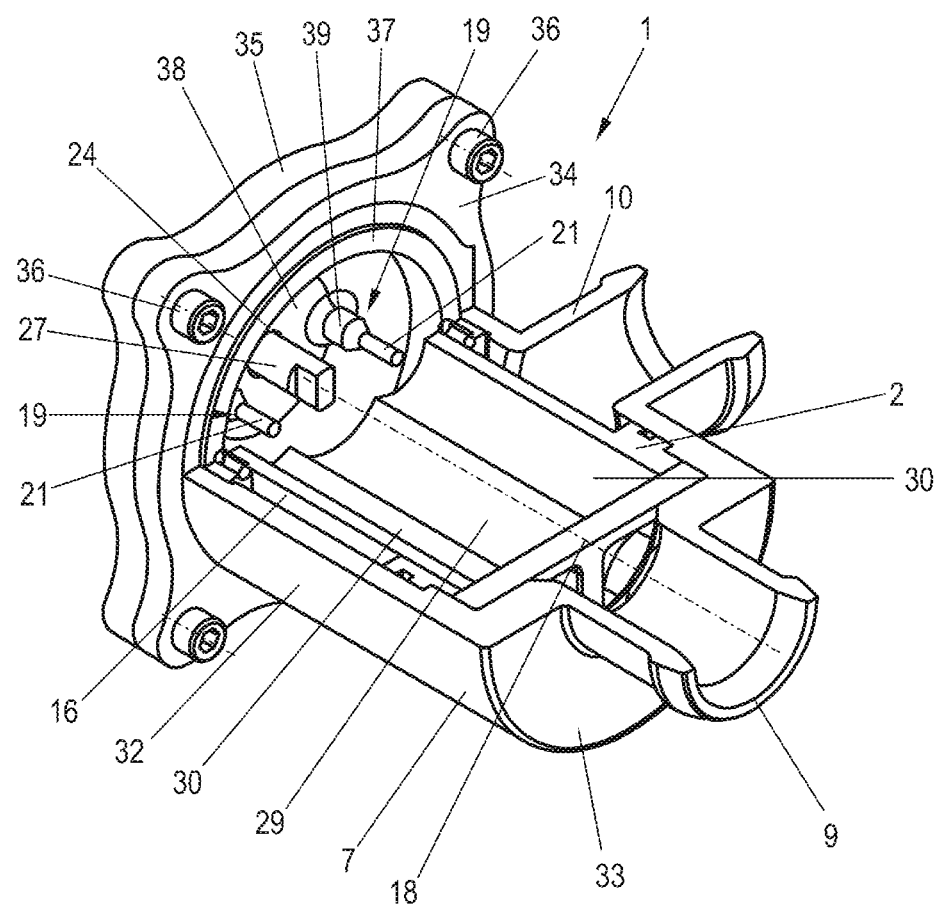
FIG. 4 shows a basic illustration of a second embodiment of a screw spindle pump according to the invention in a sectional view.

FIG. 4 shows a further embodiment of a screw spindle pump 1 according to the invention, with the same reference signs being used for components that are the same. In this exemplary embodiment, a spindle housing 2 is likewise provided, in which, in the example shown, three spindles are to be received, specifically, see FIG. 5, a central drive spindle 3 and two running spindles 4, which are offset laterally by 180° and are received in respective spindle bores 29 and 30, but are not shown in more detail in FIG. 4.

Furthermore also provided is an outer housing 7, which in this case is a one-piece, pot-like outer housing and has a cylindrical portion 32 closed by a housing wall 33. On the housing wall 33 is provided the inlet port 9, which is positioned in the middle as viewed axially, and on which there is also provided the outlet port 10, leading out radially to the side.

Also provided here is a fluid chamber 16, which is in the form of an annular pressure chamber around the circumference between the spindle housing 2 and the outer housing 7 and which extends in this case almost over the entire length of the spindle housing 2, or of the spindle bores 29, 30. This fluid chamber 16, which communicates with the outlet port 10, also communicates with the fluid outlet of the spindle housing 2, and therefore the pressurized fluid flows into it and the radial pressure applies load to the spindle housing 2.

Figure 5:
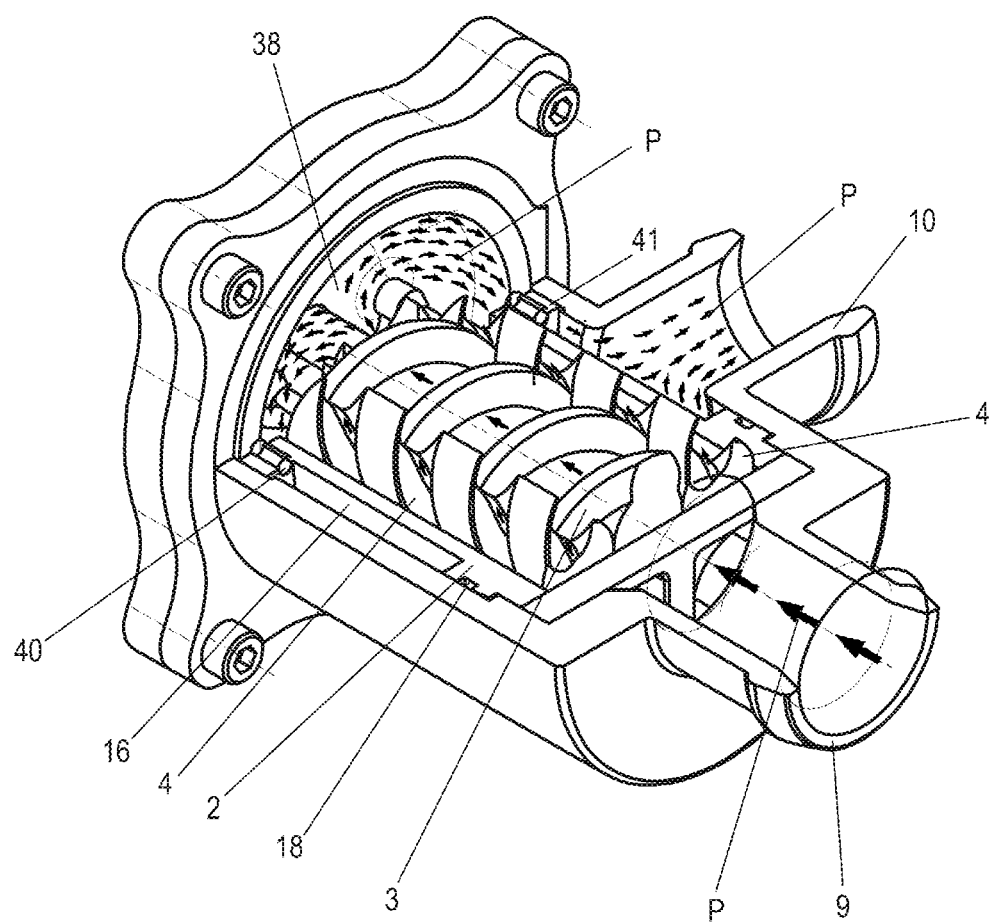
FIG. 5 shows the screw spindle pump from FIG. 4 with inserted spindles and illustrated fluid flow.

In this configuration, the outer housing 7 has a flange 34, axially arranged on which is a housing plate 35 which follows the drive motor, not shown in more detail, the arrangement being screwed together by corresponding fastening screws 36. The housing plate 35 has an axially extending annular flange 37, by way of which it engages in the cylindrical opening of the outer housing 7. In this way, a pot-like depression 38 is formed on the housing plate 35, on the bottom of which depression a bearing bore 24 is formed, through which the drive shaft 27 passes. Two support devices 19, which run axially in relation to the running spindles 4, protrude axially from the bottom of the depression 38. Each support device 19, these being integrally molded in one piece on the housing plate 35 manufactured from plastic, has a relatively wide, cylindrical base 39, from which a respective thinner support pin 21 axially protrudes, on which in turn the respective running spindle 4 can axially run. This configuration is shown in a detailed and enlarged sectional view in FIG. 6. As FIG. 6 but also FIG. 5 shows, the depression 38 has a pot-like configuration and has a rounded shape in the bottom region. This is because the fluid flowing axially out of the fluid outlet of the spindle housing 2 must be guided radially to the side and, as viewed axially, back into the fluid chamber 16 via this depression 38. The rounded shape of the depression is expedient to the effect that the radial guidance is effected outward and the deflection takes place quietly, because no flow edges and corresponding corners are provided.

The fluid flow is illustrated in FIG. 5 by the arrows P. The inflow is effected through the inlet port 9. The fluid is delivered axially by the spindle set and axially exits on the pressure side in the direction of the depression 38, which serves as deflection cavity. In the depression, said fluid is deflected to the side, see the flow arrows P, and can flow back axially, with it being able to flow into the fluid chamber 16 through corresponding apertures 40 in a radial flange 41 of the spindle housing 2 that axially delimits the fluid chamber 16. The fluid flows out of the fluid chamber, see the flow arrows P, and then to the outlet port 10.

Figure 6:
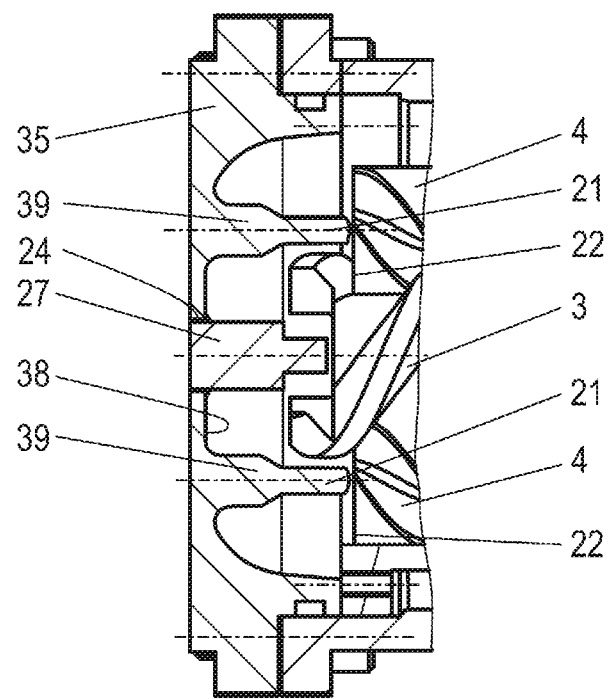
FIG. 6 shows a sectional partial view of the arrangement from FIG. 5 in the region of the housing plate.

With respect to the configuration of FIGS. 4-6, it should lastly also be noted that here the feather key 19 is fixed axially between the end face of the spindle housing 2 and the inner wall of the housing wall 33 by clamping, with a rotation-prevention means of course also being provided in the circumferential direction. In this case, the feather key 19 has a cross-shaped configuration, this making it possible as required also to arrange the spindle housing 2 and thus the spindle alignment in a manner rotated by 90° relative to the outer housing 7 when this is necessary on account of the required spatial positioning of the lateral radial outlet port 10. This is because the aim is to position the spindles 3, 4 as horizontally as possible, so that the spindle axes lie parallel in a horizontal plane, this being advantageous for delivery operation which is as efficient as possible.

In the configuration according to FIGS. 4-6, too, the drive spindle 3 and the two running spindles 4 are axially supported on either side. This is done on the one hand by the feather key 18 and on the other hand, in the case of the drive spindle 3, by the drive shaft 27 and, in the case of the running spindle 4, by the two support devices 19, or the support pins 21.

The support of the running spindles 4 that is provided on either side according to the invention, irrespective of whether it is for the 2-spindle pump or for the 3-spindle pump, also makes it possible to reverse the spindle rotation direction if required, that is to say to reverse the direction of rotation delivering the delivery volume from the suction side to the pressure side during actual delivery operation to the opposite direction of rotation, this possibly being necessary sometimes in one or another operating situation. On account of the axial support on either side, in this case there is no axial spindle displacement of the respective running spindle.

Lastly, it should also be mentioned that the drive motor, not shown in more detail, may be either a dry-running rotor or a wet-running rotor. If it is a dry-running rotor, the drive shaft 27, shown here only in a stylized manner, is received in a shaft sealing ring arranged in the bearing bore 24, with the result that no fluid can flow along the drive shaft 27 and enter the drive motor. The other sealing on this side is effected as described, either by the motor housing wall itself or by the housing plate 35. If the drive motor is a wet-running rotor to be cooled by the fluid, there is no shaft sealing ring around the drive shaft 27 in the bearing bore 24, so that the fluid can flow along the drive shaft.

While specific embodiments of the invention have been shown and described in detail to illustrate the inventive principles, it will be understood that the invention may be embodied otherwise without departing from such principles.

We claim:

1. A screw spindle pump having a spindle housing, in which a drive spindle and at least one running spindle which meshes therewith are received in spindle bores, and which has an axial fluid inlet and an axial fluid outlet, and also an outer housing enclosing the spindle housing, wherein either a support device which axially supports the at least one running spindle and comprises an axially projecting support pin is provided on the spindle housing, which consists of plastic, in the region of the fluid outlet, or a support device which axially supports the at least one running spindle and comprises an axially projecting support pin is provided on a housing plate which is fitted on the outer housing, axially closes the outer housing, and consists of plastic.

2. The screw spindle pump according to claim 1, wherein two running spindles arranged on either side of the drive spindle are provided, wherein the support device comprises two support pins, or two support devices having a respective support pin are provided.

3. The screw spindle pump according to claim 1, wherein the support pin(s) have a round, oval, or polygonal cross section.

4. The screw spindle pump according to claim 1, wherein a support device integrally molded on the spindle housing has at least one or at least two webs, wherein the or each web reaches over a spindle bore receiving the running spindle, and wherein a support pin is provided on the or each web.

5. The screw spindle pump according to claim 4, wherein the support device has a bearing bore through which a drive shaft of a drive motor passes and which bears the drive shaft.

6. The screw spindle pump according to claim 5, wherein the support device has a central annular portion, in which the bearing bore is provided and from which the webs extend to the side.

7. The screw spindle pump according to claim 1, wherein the housing plate has a pot-like depression, into which the fluid flowing out of the fluid outlet of the spindle housing flows, wherein the one or the two support devices are provided on the bottom of the depression and extend axially.

8. The screw spindle pump according to claim 7, wherein the or each support device has a base which is integrally molded on the bottom and from which the support pin, which is narrower than the base, protrudes.

9. The screw spindle pump according to claim 7, wherein the bottom has a bearing bore through which a drive shaft of a drive motor passes and which bears the drive shaft.

10. The screw spindle pump according to claim 1, wherein the spindle housing is axially open on the opposite side to the support device, wherein either holding means for fixing a support element that axially supports the drive spindle and the one or the two running spindles are provided in the region of the open end, or wherein the support element is received between the end face of the spindle housing and an axial housing wall of the outer housing.

11. The screw spindle pump according to claim 10, wherein the holding means are configured in the form of two oppositely situated apertures in the spindle housing, in which apertures the support element in the form of a feather key engages.

12. The screw spindle pump according to claim 1, wherein the axial fluid outlet for the fluid delivered through the spindle housing by the drive spindle and the running spindle communicates with a fluid chamber, which is formed between the spindle housing and the outer housing, extends around 360°, and in turn communicates with the radial fluid outlet port of the outer housing.

13. The screw spindle pump according to claim 12, wherein the fluid chamber extends over at least half the length of the spindle bore.

14. The screw spindle pump according to claim 12, wherein a depression of the housing plate serves as the deflection cavity which deflects the fluid coming from the fluid outlet of the spindle housing toward the fluid chamber.

15. The screw spindle pump according to claim 1, wherein a deflection cavity which deflects the fluid coming from the fluid outlet of the spindle housing toward the fluid chamber is provided on a housing of a drive motor fitted on the outer housing.

16. The screw spindle pump according to claim 15, wherein the one deflection cavity is an annular groove or pot-shaped depression, which has a round configuration in the region of the groove or depression base.

17. A use of a screw spindle pump according to claim 1 in a motor vehicle for the purpose of delivering an operating liquid.

18. The use according to claim 17, wherein the screw spindle pump is used as a coolant pump, in particular for delivering a coolant serving to cool an energy store.

\* \* \* \* \*